(12) United States Patent
Sato

(10) Patent No.: US 9,567,127 B2
(45) Date of Patent: Feb. 14, 2017

(54) LABEL SEPARATOR AND LABEL PRINTER INCORPORATING THE LABEL SEPARATOR

(71) Applicant: OKI DATA CORPORATION, Tokyo (JP)

(72) Inventor: Daichi Sato, Tokyo (JP)

(73) Assignee: Oki Data Corporation, Tokyo (JP)

(*) Notice: Subject to any disclaimer, the term of this patent is extended or adjusted under 35 U.S.C. 154(b) by 1 day.

(21) Appl. No.: 14/555,744

(22) Filed: Nov. 28, 2014

(65) Prior Publication Data

US 2015/0083040 A1    Mar. 26, 2015

Related U.S. Application Data

(63) Continuation of application No. 13/064,053, filed on Mar. 3, 2011, now Pat. No. 8,925,613.

(30) Foreign Application Priority Data

Mar. 5, 2010   (JP) .................................. 2010-049851

(51) Int. Cl.
| | | |
|---|---|---|
| *B32B 38/10* | (2006.01) | |
| *B65C 9/18* | (2006.01) | |
| *B65C 9/00* | (2006.01) | |
| *B65C 9/46* | (2006.01) | |
| *B65H 20/02* | (2006.01) | |

(Continued)

(52) U.S. Cl.
CPC ........... *B65C 9/1865* (2013.01); *B65C 9/0006* (2013.01); *B65C 9/46* (2013.01); *B65H 20/02* (2013.01); *B32B 38/10* (2013.01); *B41J 17/00* (2013.01); *B41J 17/18* (2013.01); *B65H 16/005* (2013.01); *B65H 29/12* (2013.01); *Y10T 156/1174* (2015.01); *Y10T 156/1195* (2015.01); *Y10T 156/195* (2015.01); *Y10T 156/1956* (2015.01);

(Continued)

(58) Field of Classification Search
CPC ........ B65H 16/005; B65H 29/12; B41J 17/00; B41J 17/18; B32B 38/10; B32B 43/006; Y10T 156/1174; Y10T 156/1195; Y10T 156/1978; Y10T 156/1994
USPC .............. 271/10.01, 117, 225, 272; 242/566, 242/615.1; 400/578, 624, 625, 629; 156/715, 156/719, 759, 760, 764, 767
See application file for complete search history.

(56) References Cited

U.S. PATENT DOCUMENTS 2,060,710 A    11/1936  Williams
3,690,996 A     9/1972  Runzi
(Continued)

FOREIGN PATENT DOCUMENTS

JP    2007-99412        4/2007
JP    2007-145527 A     6/2007

*Primary Examiner* — Mark A Osele
*Assistant Examiner* — Nickolas Harm
(74) *Attorney, Agent, or Firm* — Rabin & Berdo, P.C.

(57) ABSTRACT

A medium transporting apparatus is used for transporting a label web including a carrier web and labels adhered thereto. A platen roller transports the label web in a transport path. A pressure roller is disposed downstream of the separating member with respect to the transport path, and causes the carrier web to be kinked. The pressure roller urges the carrier web against the platen roller. A support member is mounted on a cover and rotatably supports the pressure roller. The cover is pivoted between an open position and a closed. Immediately after the cover has moved to the closed position, the pressure roller contacts the platen roller and then slides by a predetermined amount on the circumferential surface of the platen roller in a direction away from the separating member. Thus, the carrier web sandwiched between the pressure and platen rollers becomes taut.

10 Claims, 11 Drawing Sheets

(51) Int. Cl.
  *B65H 29/12*    (2006.01)
  *B41J 17/18*    (2006.01)
  *B41J 17/00*    (2006.01)
  *B65H 16/00*    (2006.01)

(52) U.S. Cl.
  CPC ..... *Y10T 156/1978* (2015.01); *Y10T 156/1994* (2015.01)

(56) References Cited

U.S. PATENT DOCUMENTS

| | | |
|---|---|---|
| 4,235,262 A | 11/1980 | Ushiro |
| 4,848,713 A | 7/1989 | Adams |
| 5,193,919 A | 3/1993 | Godo et al. |
| 5,427,460 A | 6/1995 | Kajiya |
| 5,713,679 A | 2/1998 | Taylor |
| 5,775,823 A | 7/1998 | Bekki et al. |
| 5,980,138 A | 11/1999 | Shiozaki et al. |
| 6,478,488 B1 | 11/2002 | Engel et al. |
| 8,212,850 B2 | 7/2012 | Abe et al. |
| 8,256,977 B2 | 9/2012 | Takahashi et al. |
| 2002/0038693 A1 | 4/2002 | Brough et al. |
| 2004/0079490 A1 | 4/2004 | Ito |
| 2004/0251616 A1 | 12/2004 | Sawai |
| 2006/0151118 A1 | 7/2006 | Murata et al. |
| 2007/0166092 A1 | 7/2007 | Liu et al. |
| 2007/0241909 A1 | 10/2007 | Kato |
| 2008/0283179 A1 | 11/2008 | Sink |
| 2009/0120578 A1 | 5/2009 | Ogawa |
| 2012/0132370 A1 | 5/2012 | Chen |

LABEL SEPARATOR AND LABEL PRINTER INCORPORATING THE LABEL SEPARATOR

This is a Continuation of U.S. application Ser. No. 13/064,053, filed on Mar. 3, 2011, and allowed on Aug. 29, 2014, the subject matter of which is incorporated herein by reference.

BACKGROUND OF THE INVENTION

Field of the Invention

The present invention relates to a label separator that separates labels from a carrier web and a label printer equipped with the label separator.

Description of the Related Art

FIG. 20 is a perspective view of an existing label printer 101. FIG. 21 is a perspective view of an existing label separator 120. FIG. 22 is a cross-sectional view illustrating the configuration of the existing label separator shown in FIG. 21.

Referring to FIG. 20, the label printer 101 includes a thermal head 103 mounted to an upper cover 106, and a platen roller 104 and a paper roll holder 105 mounted on a chassis 102.

The roller paper holder 105 holds a print medium in the form of a label web. The paper roll holder 105 includes two opposing support members for rotatably supporting the label web. The distance between the two opposing support members is adjustable depending on the width of the label web. The core about which the label web is wrapped is rotatably fitted to a boss on each support member of the holder, thereby loading the paper roll on the paper roll holder 105.

The upper cover 106 is pivotally supported on supports of the chassis 102. When the upper cover 106 is opened or closed relative to the label printer 101, the thermal head 103 moves into or out of engagement with the platen roller 104. The tip portion of the label web is led out through a gap between the thermal head 103 and the platen roller 104, and further outwardly from the chassis 102. The upper cover 106 is then closed with the label web sandwiched between the thermal head 103 and the upper cover 106. The rotation of the platen roller 104 causes the label web to advance, and the thermal head 103 prints on the label web under pressure.

A label web 110 includes a series of labels 112 affixed to a long belt-shaped carrier web 111, the labels being spaced by a predetermined distance. The label printer prints on the series of labels.

As shown in FIGS. 21 and 22, the label printer 101 includes a label separator 120 for separating the labels 112 from the carrier web 111.

This type of label separator 120 is disposed downstream of the thermal head 103 with respect to transport of the label web, and includes an edge member 107, a pressure roller 108, and a front cover 109. The edge member 107 abuts the label web 110 transported by the platen roller 104, causing the carrier web 111 to be kinked at a predetermined angle. The edge member 107 separates the label 112 from the carrier web 111, allowing only the carrier web 111 to advance to the gap between the pressure roller 108 and the platen roller 104. The pressure roller 108 is rotatably mounted on the front cover 104, and presses the carrier web 111 against the platen roller 104 under pressure, while being driven by the platen roller 3 in rotation.

The label web 110 is transported by the platen roller 104 past the edge member 107 after the label 112 is printed by the thermal head 103, and the label 112 is then separated from the carrier web 111 and is further transported to the outside of the apparatus through a label discharging path.

The label 112 is transported further in a substantially straight path while the carrier web 111 is bent by the edge member 107 and is then advanced to a pressing point where the carrier web 111 is pressed by the pressure roller 108 against the platen roller 104. The carrier web 111 is then transported along the label discharging path of the carrier web to the outside of the apparatus.

In this manner, the existing label separator operates to separate printed labels from the carrier web.

Japanese Patent Application Publication No. 2007-145527 discloses another type of label separator in which a drive roller is mounted to an openable-and-closable member pivotally mounted on the label printer and cooperates with a driven roller mounted to the label printer to hold the label web between the drive roller and driven roller, and the edge member causes the label to separate from the carrier web.

The above-described existing label, separator suffers from the following drawbacks. The label web is first sandwiched between the platen roller and the thermal head, and then the leading end portion of the label web is passed by manually through a gap between the pressure roller and the platen roller, and the leading end portion is pulled by the operator through the discharging path located, for example, under the front cover. If the label web is pulled by tension smaller than necessary, the label web tends to have slack therein with the result that the edge member cannot engage the label web at a sufficient angle with the carrier web, failing so separate the labels reliably.

SUMMARY OF THE INVENTION

The present invention was made in view of the above-described drawbacks.

A medium transporting apparatus is used for transporting a label web including a carrier web and labels adhered thereto. A transporting member is configured to transport a medium or a label web in a transport path. The medium is transported by the transporting member in the transport path. A separating member is disposed downstream of the separating member with respect to transport of the medium, and causes the carrier web to be kinked. A pressure roller urges the carrier web against the transporting member. A support member is configured to rotatably support the pressure roller thereon. The support member moves in a path between a first position where the pressure roller is in contact engagement with the transport member and a second position where the pressure roller is out of contact engagement with the transporting member, such that immediately after the pressure roller has moved into contact engagement with the transporting member, the pressure roller slides by a predetermined amount on the circumferential surface of the transporting member in a direction away from the separating member.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein.

DETAILED DESCRIPTION OF THE INVENTION

First Embodiment

A label separator and a label printer according to the invention will be described with reference to the accompanying drawings.

Figure 1:
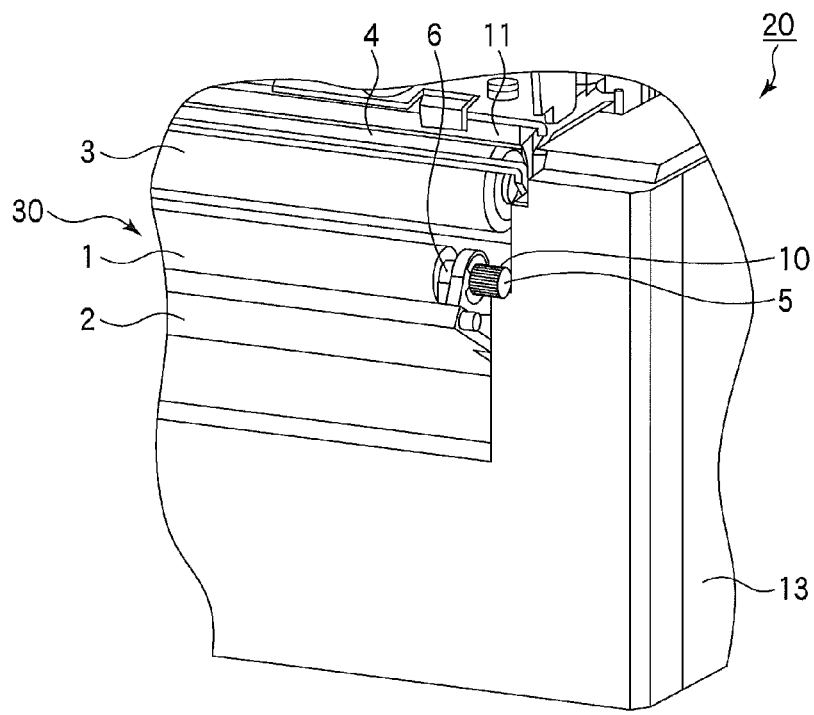
FIG. 1 is a partial perspective view of a label separator and a label printer according to a first embodiment.

FIG. 1 is a partial perspective view of a label separator and a label printer according to a first embodiment.

A label web 12 (FIG. 4) or a medium includes labels and a long belt-shaped carrier web 12a to which the labels 12b are releasably adhered at predetermined intervals. A label printer 20 prints on the labels while the label web 12 is being advanced through the label printer 20. The labels 12b are separated from the carrier web 12a, and are discharged to the outside of the printer 20.

A label separating mechanism 30, which will be described later, separates the printed labels 12b from the carrier web 12a.

Figure 2:
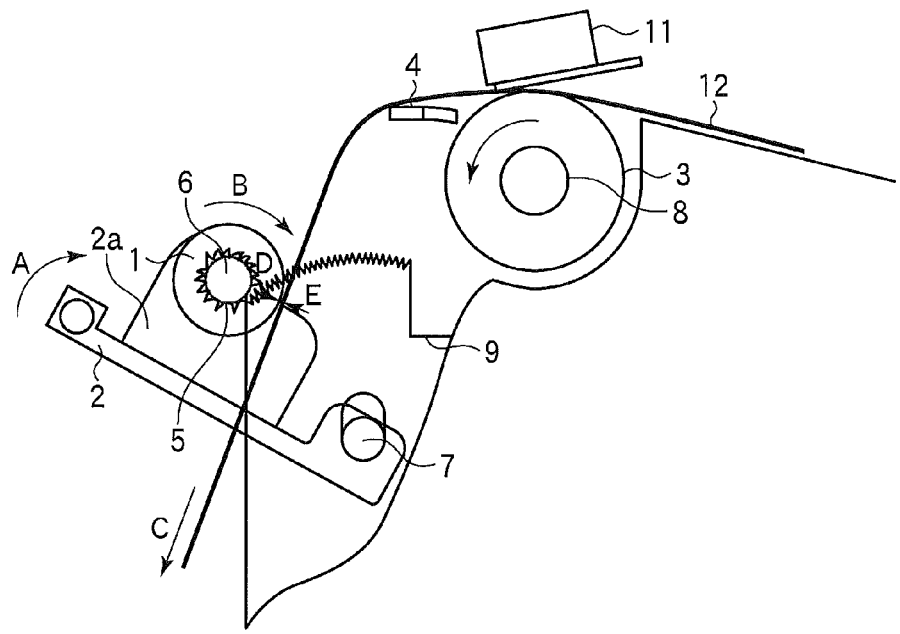
FIG. 2 is a cross-sectional view of the label separator according to the first embodiment.

FIG. 2 is a cross-sectional view of a label separator according to the first embodiment.

The label printer 20 includes a chassis 13 that supports a platen roller 3, an edge member 4, a gear toothed surface 10, a front cover 2, and an upper cover (not shown). The platen roller 3 is driven by a motor and a gear train (not shown) to rotate counterclockwise as shown in FIG. 2, thereby transporting the label web 12 and the carrier web 12a. The edge member 4 is located downstream of the platen roller 3 with respect to the transport path of the label web 12, and forms a predetermined angle with the label web 12 being transported, thereby causing the labels 12b to separate from the carrier web 12a. The platen roller 3, pressure roller 1, and edge member 4 constitute part of the label separating mechanism 30. The gear toothed surface 10 is formed in a circumferential surface on the chassis 13, the center of the circumferential surface being located at the axis of the shaft 7 shown in FIG. 2. The front cover 2 is pivotally supported at a fulcrum located at a forward portion of the chassis 13, and can be opened and closed relative to the label printer 20. When the label web 12 is loaded onto the label separating mechanism 30, the upper cover is pivotally mounted on a fulcrum located at a rearward portion of the chassis 13.

Referring to FIGS. 1 and 2, a pressure roller 1 is covered with a highly frictional rubber material and is rotatably supported on a shaft 6 which in turn supported by a brackets 2a. When the front cover 2 is in a closed position thereof, the circumferential surface of the pressure roller 1 is pressed against the circumferential surface of the platen roller 3, so that only the carrier web 12a is sandwiched between the pressure roller 1 and platen roller 3 after separation of the labels 12b from the carrier web 12a and is further transported.

Figure 4:
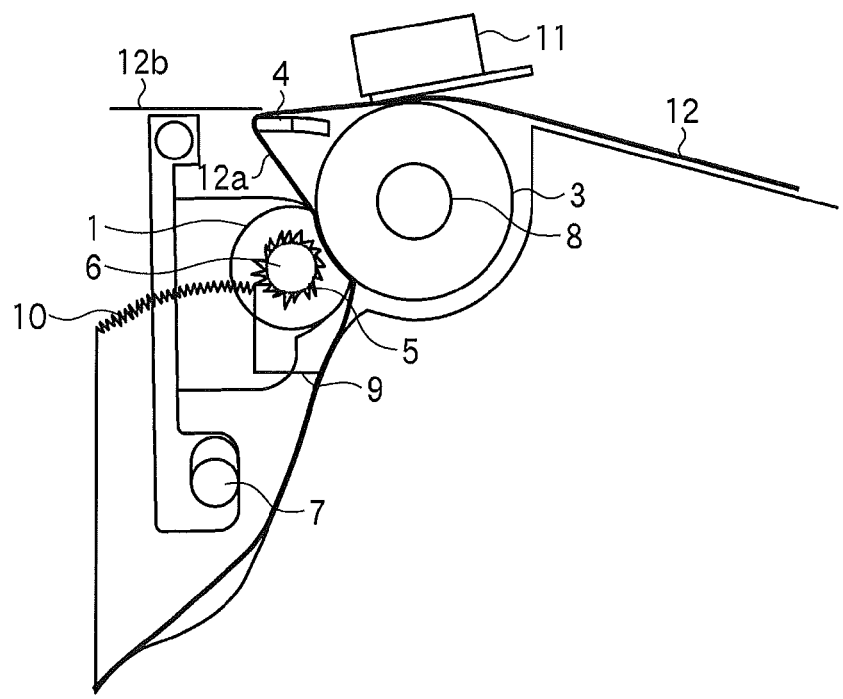
FIG. 4 illustrates a label separating mechanism after a label web is loaded and a front cover is completely closed.

The label 12b separated from the carrier web 12a is discharged through an opening defined between the front cover 2 and the chassis 13 (FIG. 4). The carrier web 12a carrying no labels 12b is discharged through an opening defined between the lower portion of the front cover 2 and the chassis 13.

A gear 5 is located at one longitudinal end of the shaft 6 on which the pressure roller 1 rotates. The gear 5 meshes with the gear toothed surface 10. The circumferential surface is on a circumference having a center thereof at the shaft 7 when the shaft 7 is at the FIG. 2 position. Thus, when the front cover 2 remains completely closed, the pressure roller 1 is driven by the platen roller 3 in rotation.

Thus, when the front cover 2 is pivoted in a direction shown by arrow A shown in FIG. 2, the gear 5 rotates while meshing with the gear toothed surface 10, thereby causing the pressure roller 1 secured to the shaft 6 to rotate in a direction shown by arrow B. Since the pressure roller 1 is secured to the shaft 6, the pressure roller 1 rotates only in the B direction.

Referring to FIG. 2, a groove 9 is formed between the gear toothed surface 10 and the platen roller 3. Once the pressure roller 1 is in abutting engagement with the platen roller 3 after closing the front cover 2, the gear 5 has moved out of meshing engagement with the gear toothed surface 10 and is over the groove 9. The pressure roller 1 is then driven by the platen roller 3 in rotation as the platen roller 3 rotates.

The mechanism is configured so that the pressure roller 1 moves into pressing engagement with the platen roller 3 while rotating in the B direction and then the gear 5 moves out of the gear toothed surface 10. Thus, pressure roller 1 rotates in such a direction as to hold the carrier web 12a between the pressure roller 1 and the platen roller 3, thereby removing slack in the carrier web 12a.

The thermal head 11 or a print head is mounted on the upper cover (not shown). Causing the upper cover to pivot causes the thermal head 11 to move into or out of abutting engagement with the platen roller 3. The thermal head 11 is urged by an urging member, for example, a spring against the platen roller 3 with the label web 12 sandwiched between the thermal head 11 and the platen roller 3.

Heat generating elements (not shown) are aligned in a longitudinal direction of the thermal head 11. The heat generating elements are energized in accordance with image data, thereby causing the heat generating elements to generate heat to print on the labels 12b either directly or indirectly via an ink ribbon.

The label printer 20 includes the upper cover and a label web holder (not shown), the thermal head 11, the chassis 13, and the label separating mechanism 30. The label separating mechanism 30 include the pressure roller 1, the front cover 2, the platen roller 3, the edge member 4, the gear 5, and the gear toothed surface 10.

The label separator of the above configuration will be described.

Figure 3:
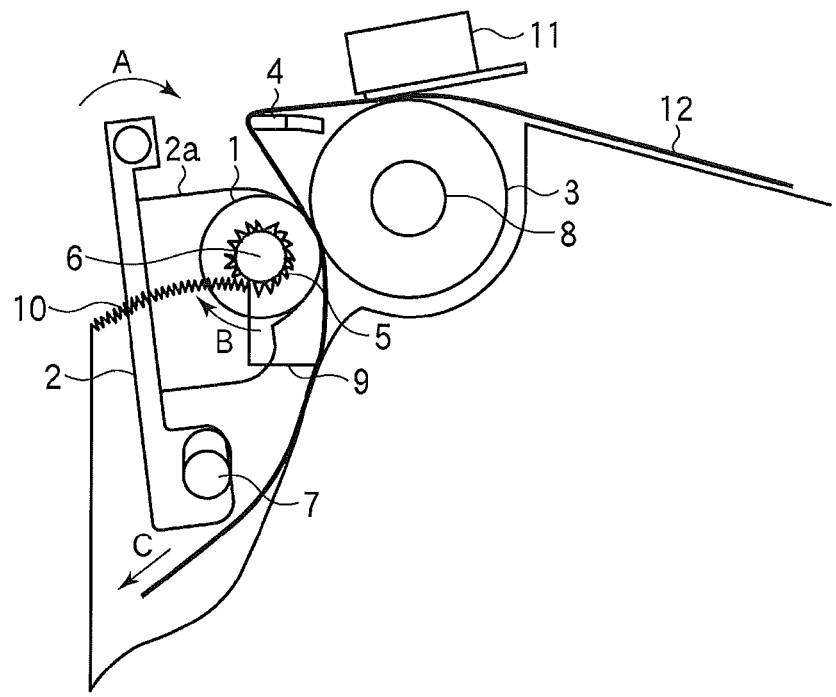
FIG. 3 illustrates a carrier web when it is sandwiched between a pressure roller and a platen roller.

FIGS. 3 and 4 are cross-sectional views of the label separator according so the first embodiment, illustrating the operation of the label separator.

Referring back to FIG. 2, the label web 12 is held between the thermal head 11 and the platen roller 3 in a sandwiched relation before the front cover 2 is closed.

At this moment, the label web 12 is unable to move in an advance direction or a scanning direction perpendicular to the advance direction. A portion of the label web 12 downstream of the thermal head 11 is suspended from the edge member 4 downstream of the thermal head 11, and resiliently abuts the pressure roller 11 due to resiliency thereof.

When the front cover 2 is pivoted about the shaft 7 in the A direction (FIG. 2), the pressure roller 1 moves toward the platen roller 3 while the gear 5 remaining in meshing engagement with the gear toothed surface 10. This causes the gear 5 to rotate in the B direction (FIG. 2).

As the front cover 2 pivots about the shaft 7, the gear 5 rotates at a higher angular the front 2. Thus, the pressure roller 1 rotates in the B direction at a higher angular speed than the front cover 2. The pressure roller 1 has a larger diameter than the gear 5, rotating at a higher circumferential speed than the gear 5.

The pressure roller 1 applies a force in a direction shown by arrow D to the label web 12, and the label web 12 applies a force in a direction shown by arrow E to the pressure roller 1 so that friction is created between the pressure roller 1 and the carrier web 12a.

The friction between the pressure roller 11 and the carrier web 12a is combined with the rotation of the pressure roller 1 in the B direction to pull the carrier web 12a in a direction shown by arrow C, thereby removing slack in the carrier web 12a between a point at which the thermal head 11 contacts the platen roller 3 and a point at which the pressure roller 1 contacts the carrier web 12a.

FIG. 3 illustrates the carrier web 12a when it is sandwiched between the pressure roller 1 and the platen roller 3. Immediately before the pressure roller 1 abuts the platen roller 3, the gear 5 is still in mesh with the gear toothed surface 10 and is rotating at its maximum speed. Thus, the pressure roller 1 continues to rotate and moves into urging engagement with the platen roller 3 with the carrier web 12a sandwiched between the pressure roller 1 and the platen roller 3. At this moment, the friction between the pressure roller 1 and the label web 12 is maximum, effectively pulling the label web 12 between the edge member 4 and the pressure roller 1 in the C direction so that the carrier web 12a becomes taut between the edge member 4 and a contact point at which the pressure roller 1 contacts the platen roller 3. Immediately after the pressure roller 1 has moved into contact engagement with the platen roller 3 while rotating, the gear 5 is still in mesh with the gear toothed. However, due to the friction among the pressure roller 1, the platen roller 3, and the carrier web 12a, the pressure roller 1 will stop rotating soon. This configuration provides sufficient force for pulling the carrier web 12a from the edge member 4 to make the carrier web 12a taut.

FIG. 4 illustrates the label separating mechanism 30 after the label web 12 is loaded and the front cover 2 is completely closed. At this moment, the gear 5 takes up a position over the groove 9 next to the gear toothed surface 10, and is no longer in meshing engagement with the gear toothed surface 10. In other words, the pressure roller 1 changes from a movable, rotating roller to a driven roller that is in contact engagement with the platen roller 3 and follows only the rotation of the platen roller 3. The pressure roller 1 as a driven roller cooperates with the platen roller 3 to advance the carrier web 12a further through a gap between the pressure roller 1 and the platen roller 3.

As described above, the pressure roller 1 is employed which causes the carrier web 12a to advance downstream of the pressure roller 1 with respect to travel of the carrier web 12a. This eliminates the need for the user to load the label web 12 while pulling the forward end of the carrier web 12a. The slack in the carrier web 12a can be removed by just closing the front cover relative to the apparatus after the label web 12 has been loaded onto the label separating mechanism 30.

Second Embodiment

Figure 5:
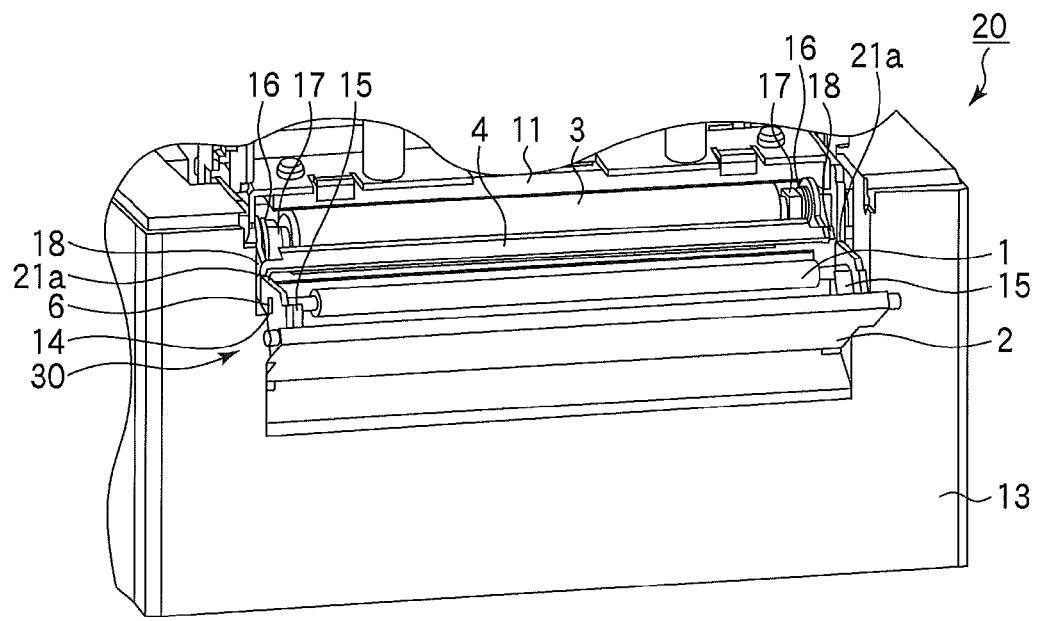
FIG. 5 is a partial perspective view of a label separator and a label printer according to a second embodiment.

FIG. 5 is a partial perspective view of a label separator and a label printer 20 according to a second embodiment, illustrating the label separator and label printer 20 when a front cover 2 is opened.

Figure 6:
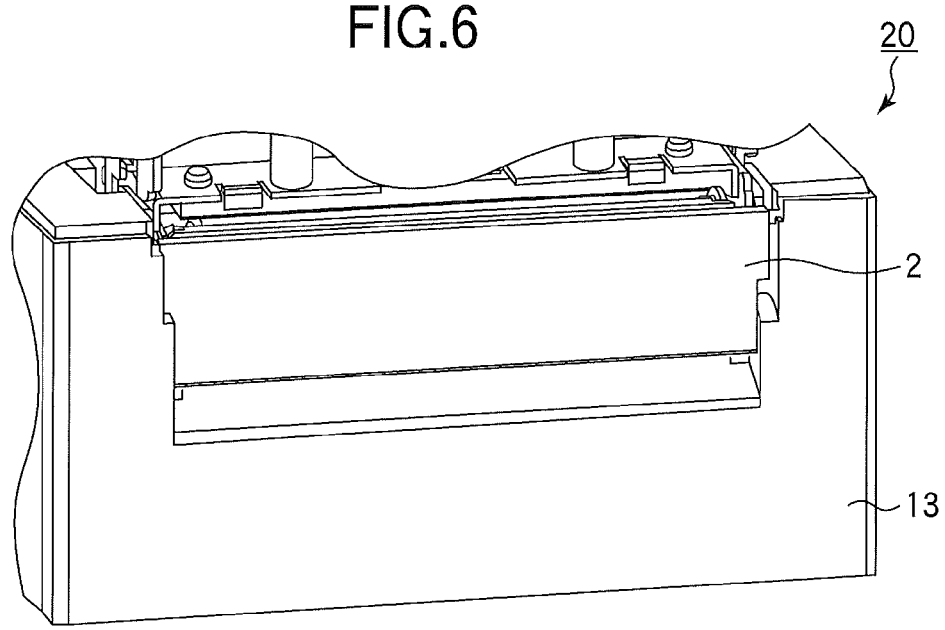
FIG. 6 is a partial perspective view of the label printer of the second embodiment when the front cover is closed.

FIG. 6 is a partial perspective view of the label printer when the front cover 2 is closed. When the labels 12b are printed, the front cover 2 is closed relative to the label printer 20 as shown in FIG. 6.

Elements similar to those of the first embodiment have been given the same reference numerals, and their description is omitted.

Referring to FIG. 5, a chassis 13 of the label print 20 supports a thermal head 11, a platen roller 3, bushings 17, an edge member 4, and a front cover 2. The thermal head 11 is mounted on an upper cover (not shown) pivotally supported on a fulcrum at a rear portion of the chassis 13. The platen roller 3 faces the thermal head 11 and is driven in rotation by a motor and a gear train (not shown) to transport the label web 12. The bushings 17 rotatably support the platen roller 3. The edge member 4 causes the carrier web 12a to kink at a predetermined angle with respect to a path of the label 12b, thereby allowing the labels 12b to leave the carrier web 12a. When the label web 12 is loaded onto the label separating mechanism 30, the front cover 2 is first opened and then closed.

The front cover 2 includes a pressure roller 1, a shaft 6 that rotatably supports the pressure roller 1, bearing holes 14 that rotatably receive the shaft 6 at longitudinal end portions, of the shaft 6, guides 15 that guide the shaft 6, and cams 21 having inclined cam surfaces 21a.

The edge member 4 is supported by support members 18 (FIG. 7) formed at longitudinal ends thereof, which in turn are pivotally supported by the bushings 17. The support members 18 each have a projection 18a. When the front cover 2 is closed relative to the apparatus, the projections 18a are pushed by the inclined cam surfaces 21a of the cams 21 (FIG. 12) so that the edge member 4 pivots about the rotational axis of the platen roller 3.

Figure 7:
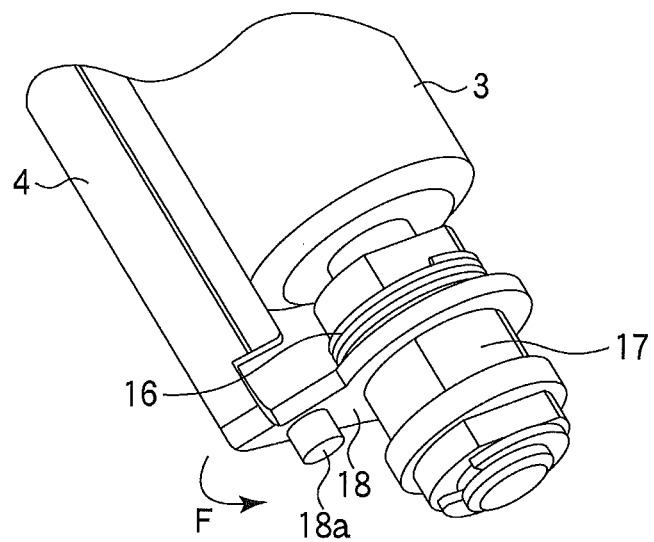
FIG. 7 illustrates an edge member and a torsion spring.

FIG. 7 illustrates the edge member 4 and the torsion springs 16 (only one is shown). The edge member 4 is rotatably supported by the bushings 17, and is urged by the torsion springs 16 which are mounted to the bushings 17 and the projections 18 of the edge member 4. The torsion springs 16 urge the edge member 4 in a direction shown by arrow F away from the thermal head 11.

Figure 8:
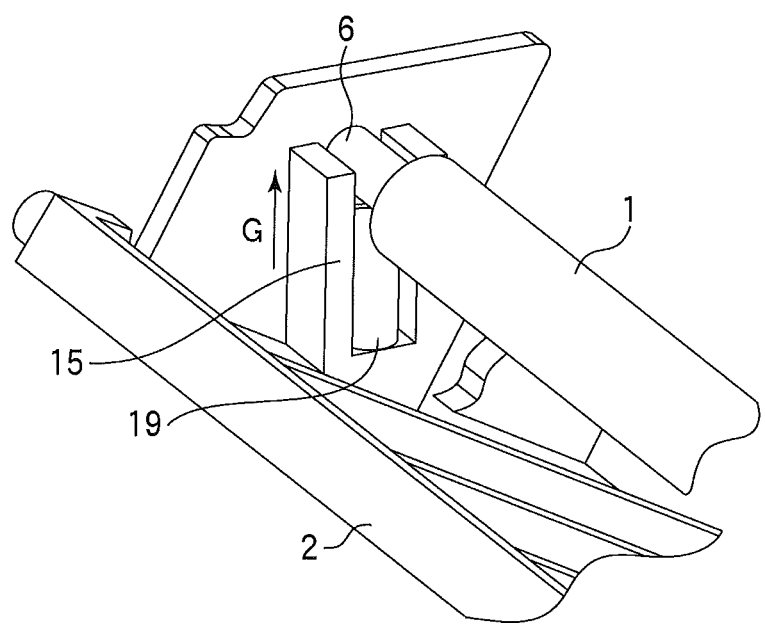
FIG. 8 illustrates a front cover and a pressure roller according to the second embodiment.

FIG. 8 illustrates the front cover 2 and the pressure roller 1. Springs 19 are mounted on the guides 15 (only one is shown in FIG. 8) that guide the shaft 6 of the pressure roller 1. The springs 19 (only one is shown in FIG. 8) urge the pressure roller 1 in a direction shown by arrow G, so that when the front cover 2 is closed, the pressure roller 1 is urged against the platen roller 3 (not shown in FIG. 8). The end portions of the springs 19 have a shape configured to the cylindrical surface of the shaft 6 so that the shaft 6 is rotatable on the end portion of the springs 19.

Figure 9:
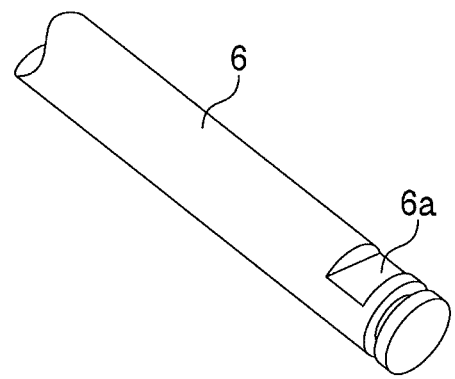
FIG. 9 illustrates a shaft of the pressure roller.

FIG. 9 illustrates the shaft 6 of the pressure roller 1.

Apart of the shaft 6 is in the shape of a deformed cylinder that has been partially cut away in a plane parallel to the longitudinal axis such that the shaft 6 has a substantially D-shaped cross section. Thus, the deformed cylinder of shaft 6 has a flat surface 6a parallel to a longitudinal axis of the shaft 6. It is to be noted that the springs 19 are disposed closer to the middle of the pressure roller 1 than flat surfaces 6a.

Figure 10:
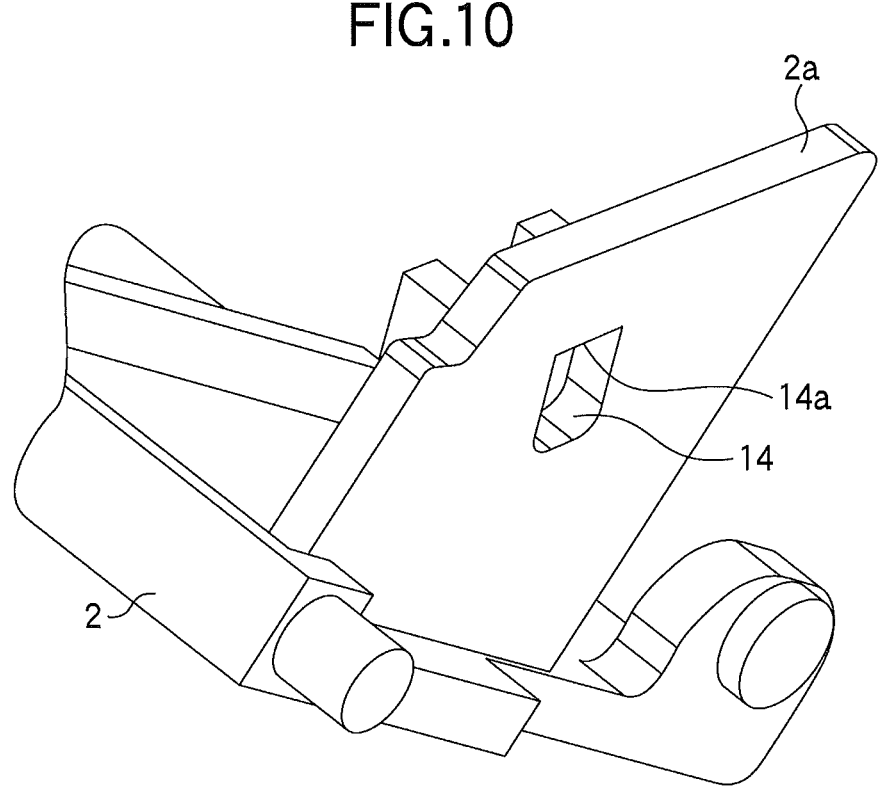
FIG. 10 illustrates a bearing hole formed in the front cover.

FIG. 10 illustrates one of the bearing holes 14 formed in the front cover 2. The bearing hole 14 is a substantially elongate hole having a substantially circumferential wall at one end thereof and a flat wall 14a at another end. The elongate hole loosely receives the shaft 6 therein, and is urged by the springs 19 toward the flat wall 14a. When the flat surface 6a abuts the flat wall 14a of the elongate hole, the shaft 6 is prevented from rotating.

The operation of the above-described configuration will be described.

Figure 11:
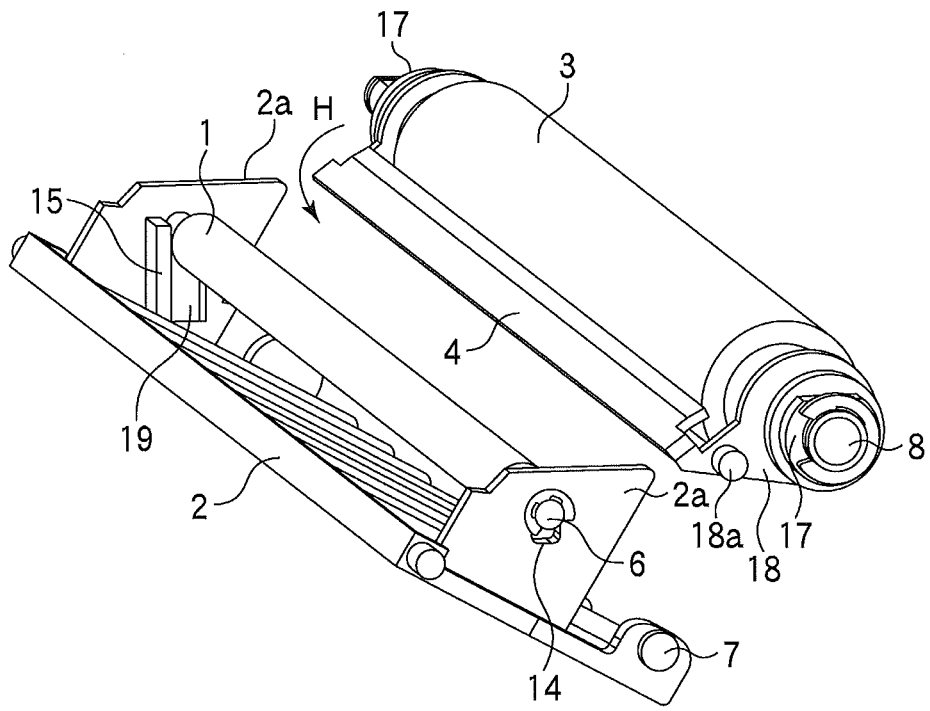
FIG. 11 illustrates the front cover opened prior to the loading of the label web onto the label separating mechanism.
Figure 12:
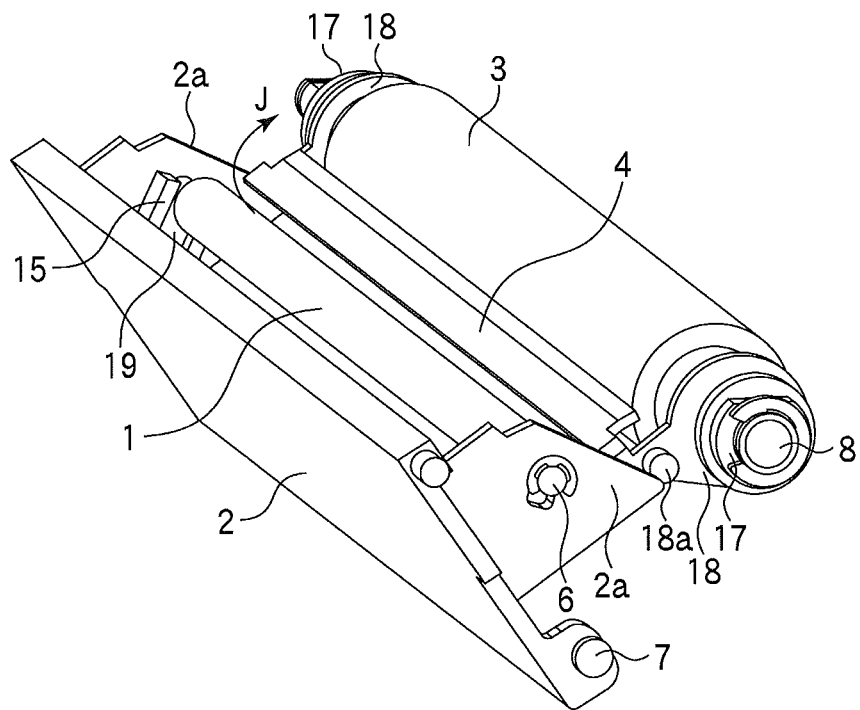
FIG. 12 illustrates when the front cover is partially closed.
Figure 13:
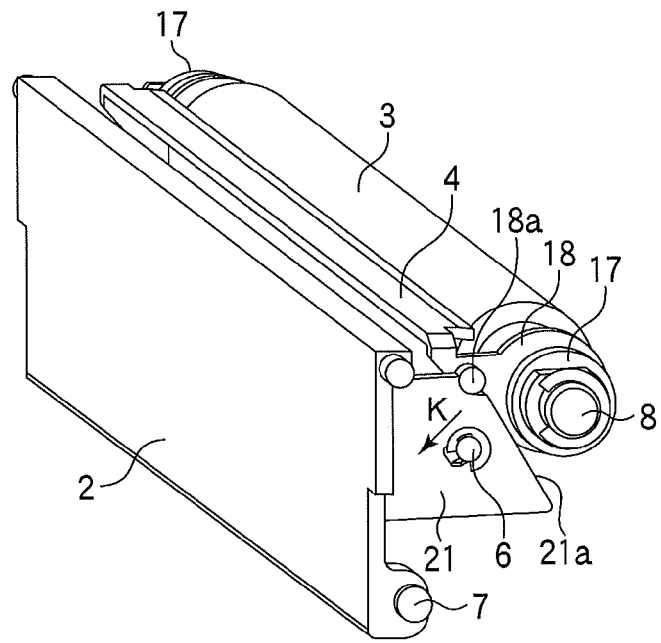
FIG. 13 illustrates the front cover that has been completely closed.

FIGS. 11-13 illustrate the operation of the label separator of the second embodiment.

FIG. 11 illustrates the front cover 2 opened prior to the loading of the label web 12. The edge member 4 is rotatably supported on the bushings 17, and is urged by torsion springs 16 in the H direction. The shaft 6 of the pressure roller 1 is urged by the springs 19 so that the flat wall 14a abuts the flat surface 6a and is prevented from rotating.

FIG. 12 illustrates when the front cover 2 is partially closed. The cam surfaces 21a of the cams 21 of the front cover 2 abut the projections 18a of the support members 18. As the front cover 2 is closed from an opened position as shown in FIG. 11, the cams 21 of the front cover 2 move into abutting engagement with the projections 18a formed on the support members 18. The cams 21 push the projections 18a, causing the edge member 4 to pivot in a direction shown by arrow J against the urging force of the torsion springs 16.

While the edge member 4 is pivoting, the pressure roller 1 is unable to rotate since the springs 19 urge the flat surfaces 6a against the flat walls 14a of the bearing holes 14.

FIG. 13 illustrates the front cover 2 that has been completely closed.

As the front cover 2 is further closed, the front cover 2 will be eventually completely closed, so that the pressure roller 1 abuts the platen roller 3 and is pushed back by the platen roller 3. As a result, the shaft 6 of the pressure roller 1 displaces in a direction shown by arrow K (FIG. 13), the flat surfaces 6a of the shaft 6 leaving the flat walls 14a free to rotate in the bearing hole 14.

The operation of the apparatus in which the slack in the carrier web 12a is removed will be described with reference to FIGS. 14-19.

Figure 14:
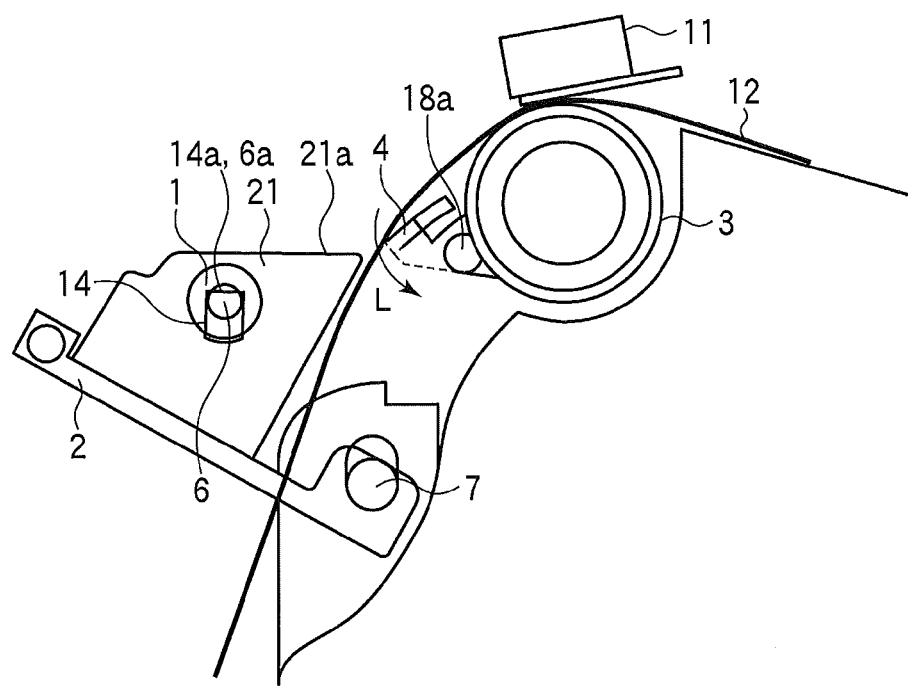
FIG. 14 illustrates the front cover when it is still fully opened after the label web has been loaded onto the separating mechanism between the thermal head and the platen roller.

FIG. 14 illustrates the front cover 2 when it is still full y opened after the label web 12 has been loaded onto the label separating mechanism between the thermal head 11 and the platen roller 3.

At this moment, the label web 12 is caught in a sandwiched relation between the thermal head 11 and the platen roller 3, and is unable to move unless the platen roller 3 rotates. The torsion springs 16 urge the edge member 14, rotatably supported by the bushing 17, in a direction shown by arrow L. The springs 19 urge the shaft 6 of the pressure roller 1 so that the flat surfaces 6a of the shaft 6 firmly abut the flat end wall 14a and the shaft 6 is therefore unable to rotate.

Figure 15:
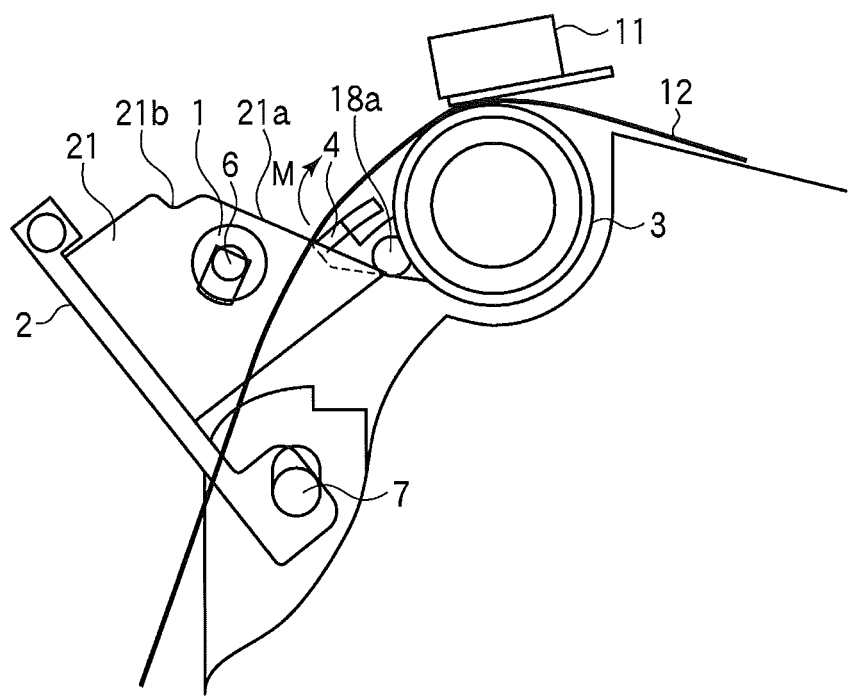
FIG. 15 illustrates when the front cover is partially closed so that the cam surfaces of the cams of the front cover abut the projections of the support members.

FIG. 15 illustrates when the front cover 2 is partially closed so that the cam surfaces 21a of the cams 21 of the front cover 2 abut the projections 18a of the support members 18.

As is clear from FIG. 15, the cam surfaces 21a of the cams 21 begin to abut the projections 18a and then push up the projections 18a, thereby causing the edge member 4 to initiate pivoting in a direction shown by arrow M.

Although the label web 12 is raised due to the pivotal movement of the edge member 4, the pressure roller 1 has not moved into engagement with the label web 12 yet. Thus, the label web 12 is not taut yet.

Figure 16:
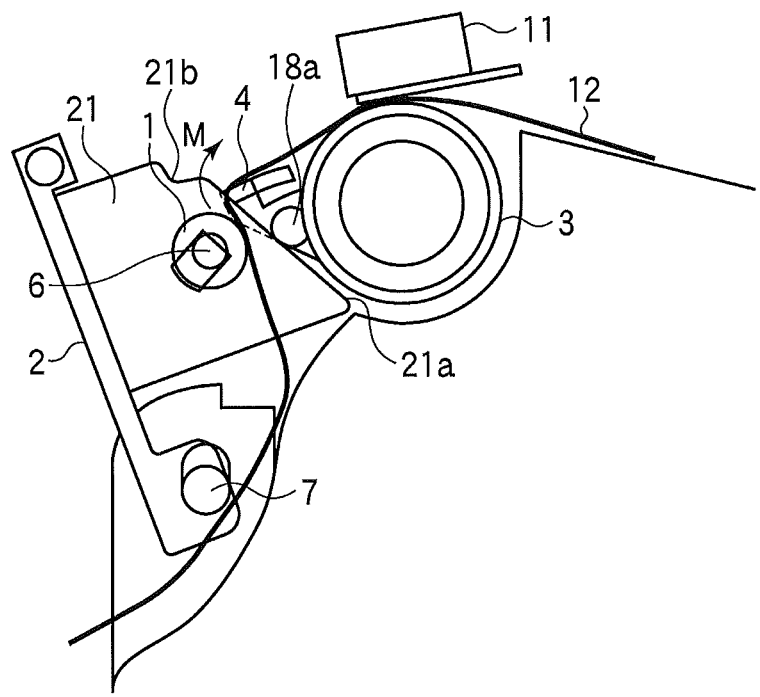
FIG. 16 illustrates when the front cover is further closed.

FIG. 16 illustrates when the front cover 2 is further closed.

As the cover 2 pivots further, the edge member 4 gradually pivots further about the platen roller 3. The edge member 4 pivots away from the pressure roller 1 in the M direction. As a result, the label web 12 begins to become taut between the pressure roller 1 and the edge member 4, thereby removing the slack in the label web 12 little by little.

Figure 17:
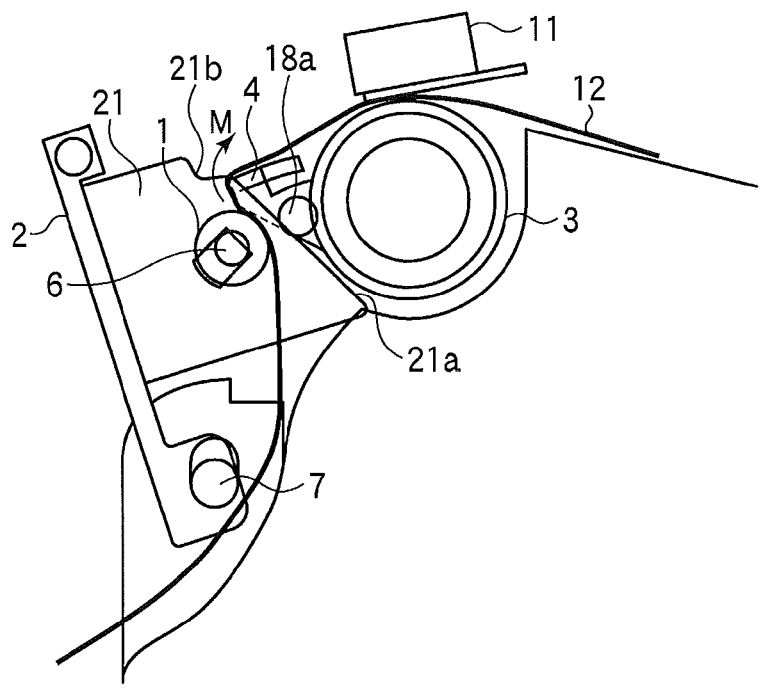
FIGS. 17 and 18 illustrate the front cover when it is closed further from the FIG. 16 position.
Figure 18:
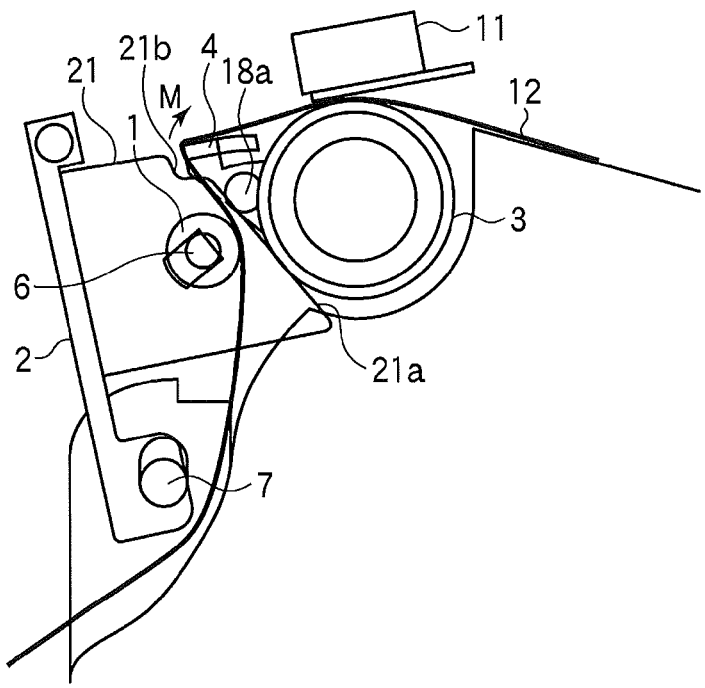

FIGS. 17 and 18 illustrate the front cover 2 when it is closed further from the FIG. 16 position.

The pressure roller 1 is still unable to rotate but the slack in the label web 12 between the pressure roller 1 may further be removed. The pressure roller 1, which is still unable to rotate, will soon move into contact engagement with the platen roller 3 with the label web 12 sandwiched between the pressure roller 1 and the platen roller 3. Shortly after the pressure roller 1 abuts the platen roller 3 and before the pressure roller 1 becomes able to rotate, the cover 2 further pivots causing the pressure roller 1 to move or slide in a direction away from the edge member 4 or substantially tangent to the circumferential surface of the platen roller 3, so that the label web 12 is pulled to become taut due to the friction between the pressure roller 1 and the label web 12 sandwiched between the pressure roller 1 and the platen roller 3. The support members 18 pivot further, contributing to making the label web 12 taut. Finally, when the cover 2 is completely closed, the projections 18a drop in recesses 21b and the pressure roller 1 is pushed back by the platen roller 3, the flat surfaces 6a of the shaft 6 moving out of contact engagement with the flat end walls 14a. It is to be noted that the springs 19 are disposed closer to the middle portion of the pressure roller 1 than the flat surfaces 6a (FIG. 9). Thus, once the flat surfaces 6a have moved out of contact engagement with the flat end walls 14a, the shaft 6 becomes rotatably supported at its cylindrical portion closer to the middle portion of the pressure roller 1 than the flat surfaces 6a.

Figure 19:
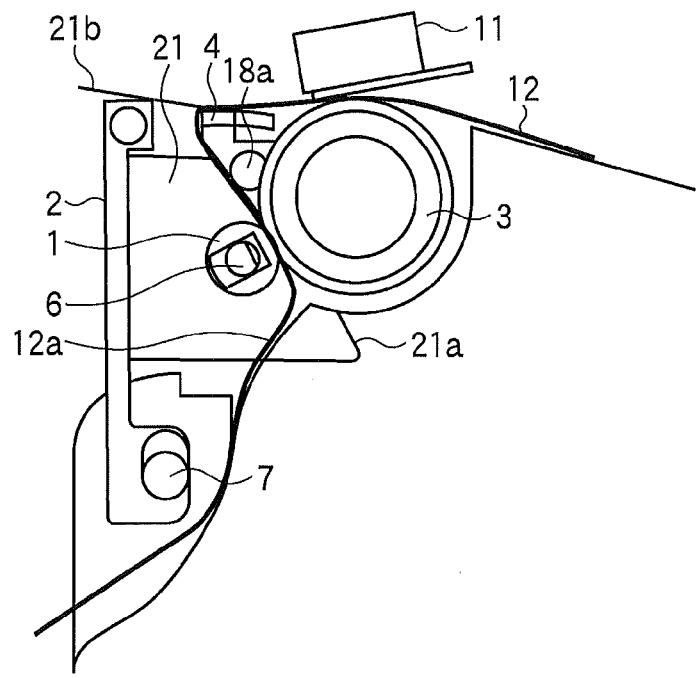
FIG. 19 illustrates the front cover that has been completely closed and the label web that has been loaded onto the label separating mechanism.
Figure 20:
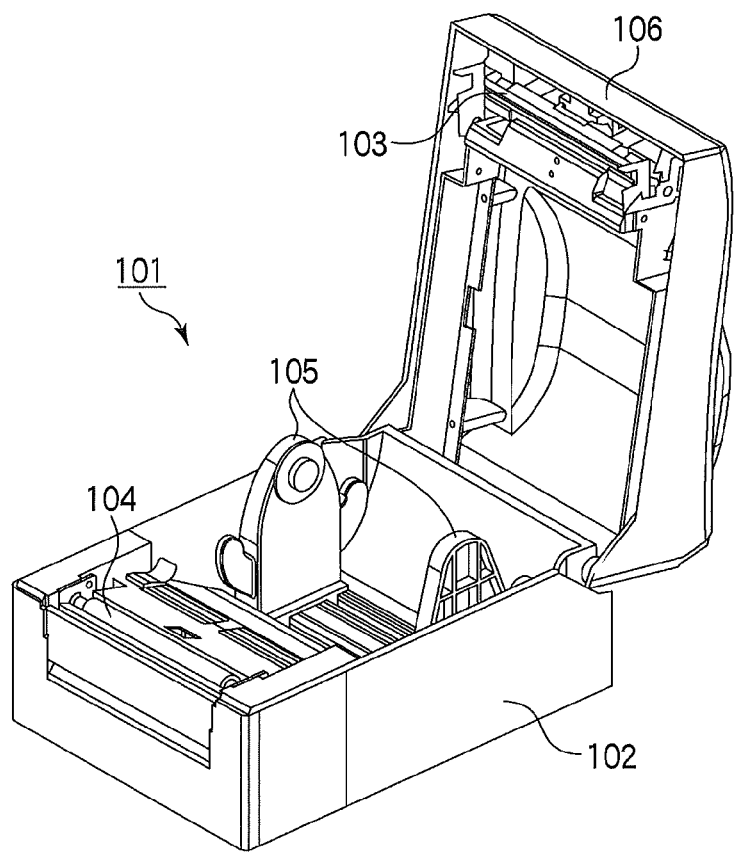
FIG. 20 is a perspective view of an existing label printer.
Figure 21:
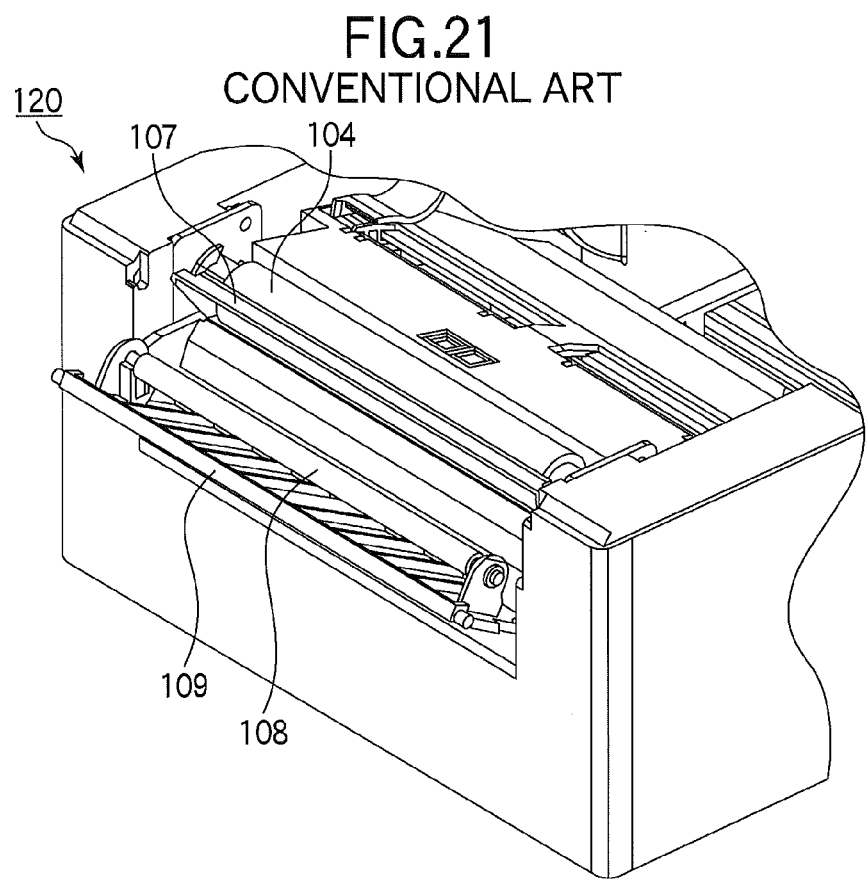
FIG. 21 is a perspective view of an existing label separator.
Figure 22:
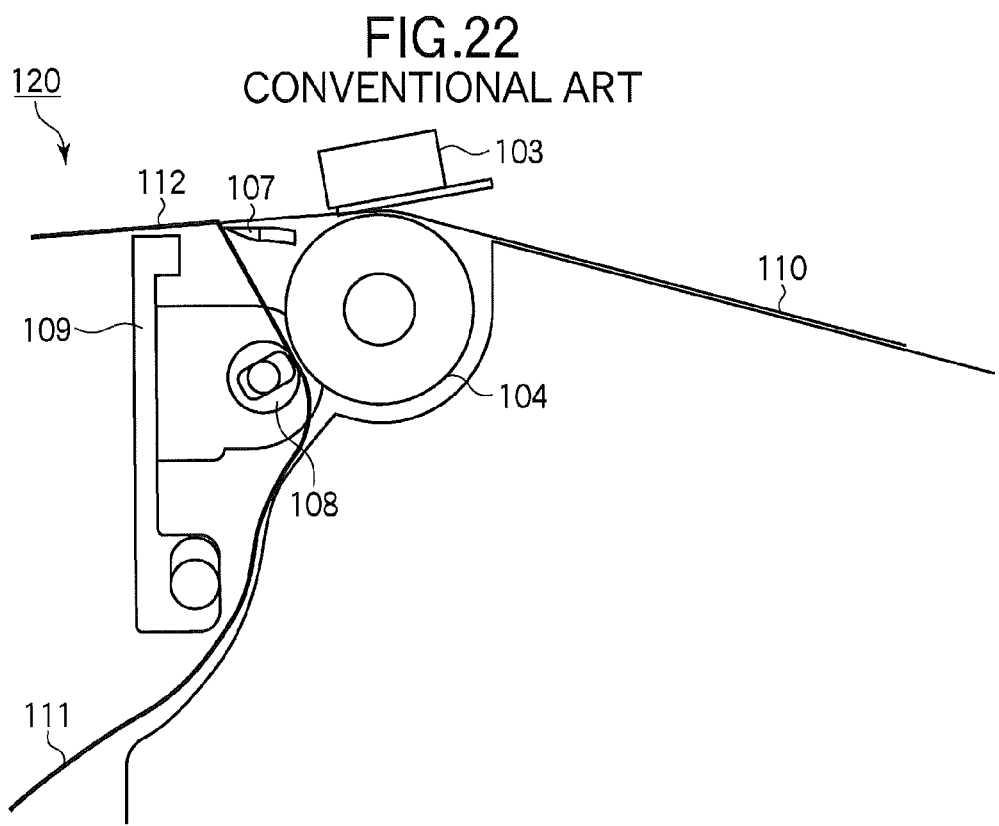
FIG. 22 is a cross-sectional view illustrating the configuration of the existing label separator shown in FIG. 21.

FIG. 19 illustrates the front cover 2 that has been completely closed and the label web 12 that has been loaded onto the label separating mechanism.

When the cover 2 is at the position shown in FIG. 19, the slack has been removed completely from the label web 12 between the edge portion of the edge member 4 and a point where the carrier web 12a is sandwiched between the pressure roller 1 and the platen roller 3. This allows the carrier web 12a to be kinked at a sufficiently sharp angle at the edge member 4 so that the label 12b separates from the carrier web 12a.

Thus, the pressure roller 1 now becomes able to rotate. In other words, the pressure roller 1 now rotates following the Platen roller 3 so that the pressure roller 1 cooperates with the platen roller 3 to discharge the carrier web 12a.

As described above, the apparatus employs a pressure roller that restricts the movement of the carrier web 12a in accordance with the closing movement of the front cover, and an edge member that pivots in such a direction as to leave the pressure roller. This configuration eliminates the need for the user to load the label web 12 while pulling the free end of the carrier web 12a. Instead, the carrier web 12a may be pulled to remove the slack in the carrier web 12a by just closing the front cover. Thus, the carrier web 12a may be kinked by a sufficient angle at the edge member, allowing the label 12b to separate from the carrier web 12a.

The first and second embodiments have been described in terms of a label printer. The present invention is not limited to the label printer, and may be applicable to all types of printers configured to print on labels 12b, and label separators.

The configuration of the second embodiment may be Combined with that of the first embodiment. The invention being thus described, it will be obvious that the same may be varied in many ways. Such variations are not to be regarded as a departure from the scope of the invention, and all such modifications as would be obvious to one skilled in the art are intended to be included within the scope of the following claims.

What is claimed is:

1. A medium transporting apparatus, comprising:
a transporting member configured to transport a medium in a transport path;
a separating member via which the medium is transported by the transporting member in the transport path, the separating member being pivotally supported relative to a chassis of the medium transporting apparatus, the separating member including an edge member that abuts the medium to cause the medium to kink, and a support that supports the edge member and is pivotally supported about a rotational axis of the transporting member;
a pressure roller disposed downstream of the separating member with respect to the transport path, the pressure roller urging the medium, which has passed the separating member, against the transporting member; and
a support member configured to rotatably support the pressure roller thereon, the support member being movable between a first position where the pressure roller is out of contact engagement with the transporting member and a second position where the pressure roller is in contact engagement with the transporting member via the medium, the separating member being configured to pivot in a direction away from the pressure roller due to movement of the support member from the first position to the second position, the support member including a cam configured to, when the support member moves from the first position to the second position, push said support to cause the edge member to pivot about the rotational axis of the transporting member in the direction away from the pressure roller.

2. The medium transporting apparatus according to claim 1, wherein the separating member pivots in the direction away from the pressure roller while the pressure roller is pressed against the transporting member via the medium.

3. The medium transporting apparatus according to claim 1, wherein the support member is configured to prevent the pressure roller from rotating when the separating member pivots in the direction away from the pressure roller, and allow the pressure roller to rotate in the second position.

4. The medium transporting apparatus according to claim 3, wherein the support member is configured to prevent the pressure roller from rotating when the separating member pivots in the direction away from the pressure roller while the pressure roller is pressed against the transporting member via the medium.

5. The medium transporting apparatus according to claim 1, wherein the support member is configured to,
when moving toward the second position while pressing the pressure roller against the transporting member via the medium, prevent the pressure roller from rotating to cause the pressure roller to slide by a predetermined amount on the transporting member in a direction away from the separating member, and
allow the pressure roller to rotate in the second position.

6. A label separator incorporating the medium transporting apparatus according to claim 1, wherein the medium transporting apparatus further comprises an openable-and-closable cover that supports the support member;
wherein the medium is a label web including a carrier web and labels releasably adhered to the carrier web; and
wherein the separating member includes an edge that abuts the carrier web to cause the carrier web to kink so that the labels are separated from the carrier web, and the carrier web, from which the labels have been separated, advances to a gap between the pressure roller and the transporting member.

7. A printer incorporating the medium transporting apparatus according to claim 1, further comprising an openable-and-closable cover that supports the support member;
wherein the medium is a label web including a carrier web and labels releasably adhered to the carrier web, and
wherein the separating member includes an edge that abuts the carrier web to cause the carrier web to kink so that the labels are separated from the carrier web, and the carrier web, from which the labels have been separated, advances to a gap between the pressure roller and the transporting member.

8. A medium transporting apparatus, comprising:
a transporting member configured to transport a medium in a transport path;
a separating member via which the medium is transported by the transporting member in the transport path, the separating member being pivotally supported relative to a chassis of the medium transporting apparatus;
a pressure roller disposed downstream of the separating member with respect to the transport path, the pressure roller urging the medium, which has passed the separating member, against the transporting member, the pressure roller including a shaft with a first flat surface; and a support member configured to rotatably support the pressure roller thereon, the support member being movable between a first position where the pressure roller is out of contact engagement with the transporting member and a second position where the pressure roller is in contact engagement with the transporting member via the medium, the separating member being configured to pivot in a direction away from the pressure roller due to movement of the support member from the first position to the second position, wherein the support member includes:
  a portion having a hole receiving the shaft and a second flat surface defining a part of the hole, the second flat surface preventing the shaft from rotating when abutting the first flat surface; and
  an urging member configured to urge the shaft against the second flat surface so that the first flat surface abuts the second flat surface; and wherein the support member is configured to prevent the pressure roller from rotating when the separating member pivots in the direction away from the pressure roller, and allow the pressure roller to rotate in the second position;

wherein when the support member is in the second position, the transporting member presses the pressure roller against the urging of the urging member so that the first flat surface is out of abutting engagement with the second flat surface.

9. The medium transporting apparatus according to claim 8, wherein the support member is configured to, when moving from the first position to the second position, push the separating member to pivot in the direction away from the pressure roller.

10. A medium transporting apparatus, comprising:
a transporting member configured to transport a medium in a transport path;
a separating member via which the medium is transported by the transporting member in the transport path, the separating member being pivotally supported relative to a chassis of the medium transporting apparatus;
a pressure roller disposed downstream of the separating member with respect to the transport path, the pressure roller urging the medium, which has passed the separating member, against the transporting member, the pressure roller including a shaft with a first flat surface; and a support member configured to rotatably support the pressure roller thereon, the support member being movable between a first position where the pressure roller is out of contact engagement with the transporting member and a second position where the pressure roller is in contact engagement with the transporting member via the medium, the separating member being configured to pivot in a direction away from the pressure roller due to movement of the support member from the first position to the second position, wherein the support member includes:
  a portion having a hole receiving the shaft and a second flat surface defining a part of the hole, the second flat surface preventing the shaft from rotating when abutting the first flat surface; and
  an urging member configured to urge the shaft against the second flat surface so that the first flat surface abuts the second flat surface;

wherein the support member is configured to,
  when moving toward the second position while pressing the pressure roller against the transporting member via the medium, prevent the pressure roller from rotating to cause the pressure roller to slide by a predetermined amount on the transporting member in a direction away from the separating member, and
  allow the pressure roller to rotate in the second position; and wherein when the support member is in the second position, the transporting member presses the pressure roller against the urging of the urging member so that the first flat surface is out of abutting engagement with the second flat surface.

* * * * *